US012592466B2

(12) United States Patent
Ronay et al.

(10) Patent No.: US 12,592,466 B2
(45) Date of Patent: Mar. 31, 2026

(54) DEFORMABLE CONDUCTIVE STRUCTURES AND METHODS FOR FABRICATION

(71) Applicant: Liquid Wire Inc., Portland, OR (US)

(72) Inventors: Mark Ronay, Portland, OR (US); Edward Godshalk, Newberg, OR (US)

(73) Assignee: Liquid Wire Inc., Portland, OR (US)

( * ) Notice: Subject to any disclaimer, the term of this patent is extended or adjusted under 35 U.S.C. 154(b) by 0 days.

(21) Appl. No.: 18/299,215

(22) Filed: Apr. 12, 2023

(65) Prior Publication Data

US 2023/0361445 A1 Nov. 9, 2023

Related U.S. Application Data

(63) Continuation of application No. 16/868,522, filed on May 6, 2020, now Pat. No. 11,664,565.

(60) Provisional application No. 62/844,039, filed on May 6, 2019.

(51) Int. Cl.
*H01P 3/06* (2006.01)
*H01P 11/00* (2006.01)

(52) U.S. Cl.
CPC .............. *H01P 3/06* (2013.01); *H01P 11/005* (2013.01)

(58) Field of Classification Search
CPC ........... H01P 3/06; H01P 11/005; H01P 3/081
See application file for complete search history.

(56) References Cited

U.S. PATENT DOCUMENTS

| | | | |
|---|---|---|---|
| 3,260,972 A | 7/1966 | Gunter | |
| 3,555,170 A | 1/1971 | Petzetakis | |
| 6,495,764 B1 | 12/2002 | Hori | |
| 6,717,493 B2 | 4/2004 | Chopra et al. | |

(Continued)

FOREIGN PATENT DOCUMENTS

| | | | |
|---|---|---|---|
| GB | 2173048 A * | 10/1986 | ................ H01P 9/00 |
| WO | WO-2020227452 A1 | 11/2020 | |

OTHER PUBLICATIONS

"U.S. Appl. No. 16/868,522, Non Final Office Action mailed Apr. 12, 2022".
"U.S. Appl. No. 16/868,522, Non Final Office Action mailed Sep. 30, 2021".
"U.S. Appl. No. 16/868,522, Notice of Allowance mailed Jan. 11, 2023", 7 pgs.
"U.S. Appl. No. 16/868,522, Response filed Sep. 12, 2022 to Non Final Office Action mailed Apr. 12, 2022", 7 pgs.

(Continued)

*Primary Examiner* — Andrea Lindgren Baltzell
*Assistant Examiner* — Kimberly E Glenn
(74) *Attorney, Agent, or Firm* — Quinn IP Law

(57) ABSTRACT

A conductive assembly may include a deformable substrate disposed around an axis, and a deformable conductor arranged on the deformable substrate. The substrate may be arranged to form a channel along the axis, and the deformable conductor may be arranged on the deformable substrate to form a waveguide. The deformable substrate, the first deformable conductor, and a second deformable conductor may be arranged to form a microstrip or a coaxial transmission line. A deformable transmission line may include a deformable substrate arranged in a substantially enclosed channel around an axis, a first deformable conductor arranged in a trace along the axis of the deformable substrate, and a second deformable conductor arranged on the deformable substrate to form a reference conductor for the first deformable conductor. A method of fabricating a deformable conductive assembly may include forming a deformable conductor on a deformable substrate, and disposing the deformable substrate around an axis.

19 Claims, 6 Drawing Sheets

(56) References Cited

U.S. PATENT DOCUMENTS

| | | | | |
|---|---|---|---|---|
| 7,026,891 | B2 | 4/2006 | Mazzochette | |
| 8,859,898 | B2 | 10/2014 | Frye | |
| 10,928,180 | B2 * | 2/2021 | Holman | G06F 3/0416 |
| 11,664,565 | B1 | 5/2023 | Ronay et al. | |
| 2002/0157865 | A1 | 10/2002 | Noda | |
| 2003/0075846 | A1 | 4/2003 | Fryberger et al. | |
| 2009/0015270 | A1 | 1/2009 | Hayakawa et al. | |
| 2011/0018657 | A1 | 1/2011 | Cheng et al. | |
| 2011/0132641 | A1 | 6/2011 | Wong et al. | |
| 2012/0273259 | A1 | 11/2012 | Palin | |
| 2013/0312541 | A1 | 11/2013 | Majidi et al. | |
| 2016/0290880 | A1 | 10/2016 | Lewis et al. | |
| 2017/0050363 | A1 | 2/2017 | Williams et al. | |
| 2017/0093007 | A1 | 3/2017 | Elsherbini et al. | |
| 2021/0065930 | A1 * | 3/2021 | Ooshima | H01B 7/04 |

OTHER PUBLICATIONS

"U.S. Appl. No. 16/868,522, Response filed Dec. 28, 2021 to Non Final Office Action mailed Sep. 30, 2021", 8 pgs.

"European Application Serial No. 20802521.3, Extended European Search Report mailed May 25, 2023", 7 pgs.

"European Application Serial No. 20802521.3, Response to Communication pursuant to Rules 161 and 162 filed Jul. 6, 2022", 8 pgs.

"International Application Serial No. PCT/US2020/031736, International Preliminary Report on Patentability mailed Nov. 18, 2021", 8 pgs.

"International Application Serial No. PCT/US2020/031736, International Search Report mailed Aug. 27, 2020", 2 pgs.

"International Application Serial No. PCT/US2020/031736, Written Opinion mailed Aug. 27, 2020", 6 pgs.

* cited by examiner

DEFORMABLE CONDUCTIVE STRUCTURES AND METHODS FOR FABRICATION

CROSS-REFERENCE TO RELATED APPLICATION

This application is a continuation of U.S. patent application Ser. No. 16/868,522, filed May 6, 2020, which application claims priority from U.S. Provisional Patent Application Ser. No. 62/844,039 filed May 6, 2019 which are incorporated by reference.

BACKGROUND

Waveguides and transmission lines may be fabricated in various forms including microstrip, stripline, coplanar waveguide, coaxial cable, twinaxial cable, etc. The selection and configuration of materials used for conductors, dielectrics, etc., may determine the characteristic impedance of a waveguide or transmission line.

SUMMARY

A conductive assembly may include a deformable substrate disposed around an axis, and a deformable conductor arranged on the deformable substrate. The substrate may be arranged to form a channel along the axis, and the deformable conductor may be arranged on the deformable substrate to form a waveguide. The channel may be substantially enclosed. The deformable conductor may be a first deformable conductor, and the assembly may further include a second deformable conductor arranged on the deformable substrate. The first deformable conductor may be arranged substantially along the axis, and the second deformable conductor may be arranged as a reference conductor to form a transmission line with the first deformable conductor. The deformable substrate, the first deformable conductor, and the second deformable conductor may be arranged to form a microstrip transmission line. The first deformable conductor, and the second deformable conductor may be arranged to form a coaxial transmission line. The conductive assembly may further include a third deformable conductor arranged on the deformable substrate. The third deformable conductor may be arranged as a reference conductor to form a stripline with the first deformable conductor and the second deformable conductor. The third deformable conductor may be arranged substantially along the axis, and the deformable substrate, the first deformable conductor, the second deformable conductor and the third deformable conductor may be arranged to form a twinaxial transmission line.

A deformable transmission line may include a deformable substrate arranged in a substantially enclosed channel around an axis, a first deformable conductor arranged in a trace along the axis of the deformable substrate, and a second deformable conductor arranged on the deformable substrate to form a reference conductor for the first deformable conductor. The second deformable conductor may be arranged to form a microstrip with the first deformable conductor. The second deformable conductor may be arranged to substantially enclose the first deformable conductor, thereby forming a coaxial transmission line. The second deformable conductor may include an opening arranged to change the impedance of the transmission line in response to an object proximate the opening. This opening may also be used to allow coupling of the first conductor to objects on the exterior of the second conductor.

A method of fabricating a deformable conductive assembly may include forming a deformable conductor on a deformable substrate, and disposing the deformable substrate around an axis. The deformable substrate may be rolled around the axis. The deformable substrate may be folded around the axis. The deformable conductor may be a first deformable conductor, and the method may further include forming a second deformable conductor on the deformable substrate. The first deformable conductor may be formed on a first surface of the deformable substrate, and the second deformable conductor may be formed on the first surface of the deformable substrate. The first deformable conductor may be formed on a first surface of the deformable substrate, and the second deformable conductor may be formed on a second surface of the deformable substrate opposite the first surface.

BRIEF DESCRIPTION OF THE DRAWINGS

The figures are not necessarily drawn to scale and elements of similar structures or functions may generally be represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings.

DETAILED DESCRIPTION

Some of the inventive principles of this patent disclosure relate to deformable conductive assemblies that may function, for example, as transmission lines and/or waveguides, and methods for fabricating such assemblies.

Figure 1:
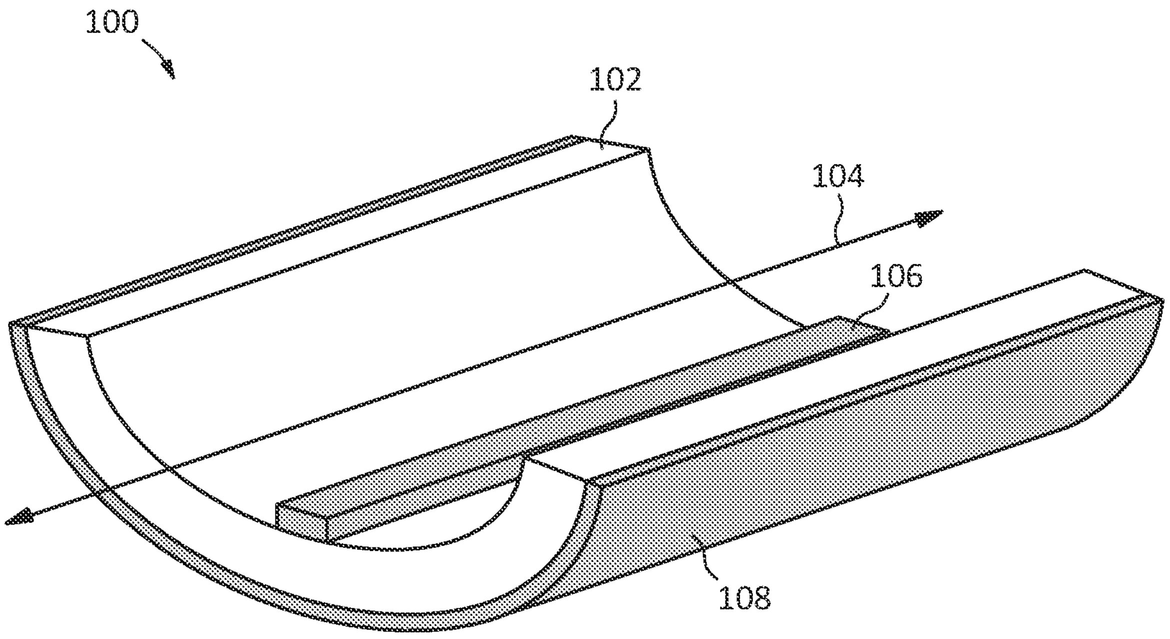
FIG. 1 is a perspective view of an embodiment of a conductive assembly according to this disclosure.

FIG. 1 is a perspective view of an embodiment of a conductive assembly according to this disclosure. The embodiment 100 of FIG. 1 includes a deformable substrate 102 disposed around an axis 104. Although the substrate 102 is shown in a partially curved configuration around the axis 104, in other embodiments, the substrate 102 may have any cross-sectional shape including square, triangular, U-shaped, stacked with one or more folds, etc., and may be disposed around the axis 104 to any extent, either partially as shown in FIG. 1, or in a substantially or completely enclosed configuration.

The embodiment 100 may include a deformable conductor 106 on the inside of the deformable substrate 102. The deformable conductor 106 is illustrated as a trace arranged along the axis 104, but the deformable conductor 106 may be arranged in any pattern. Additionally, or alternatively, the embodiment 100 may include a second deformable conductor 108 on the outside of the deformable substrate 102. The second deformable conductor is illustrated as an area of conductor covering the outside surface of the deformable substrate 102, but the second deformable conductor 108 may be arranged in any pattern. In other embodiments, any number of deformable conductors may be included on either side of the substrate.

In the embodiment 100 illustrated in FIG. 1, the first and second deformable conductors 106 and 108 may be used as essentially a microstrip transmission line along the axis 104 with the deformable substrate 102 functioning as a dielectric. Other embodiments may be modified to form various waveguides, transmission lines, and/or other conductive structures. For example, the deformable substrate 102 and second deformable conductor 108 may be extended to create a substantially enclosed channel around the axis 104, thereby forming a coaxial transmission line. As another example, the deformable substrate 102 and second deformable conductor 108 may be extended to form a substantially enclosed channel around the axis 104, but the first deformable conductor 106 may be omitted, thereby enabling the second deformable conductor 108 to form a waveguide. Alternatively, the second deformable conductor 108 may be omitted from the outside of the substrate 102, and the first deformable conductor 106 may be extended to cover substantially the entire inside of the substrate 102, thereby forming a waveguide.

In some embodiments, the deformable substrate 102 may be implemented with any suitable material or combination of materials that may provide deformable characteristics which, in various embodiments, may be characterized as: soft, stretchable, resilient, flexible, compressible, pliable, elastic, and/or the like. In various embodiments, the substrate 102, or portions thereof, may or may not spontaneously return to a neutral state when various forces associated with physical manipulation are removed.

Some examples of materials that may be used for the deformable substrate 102 body include any flexible and/or stretchable material such as solid and/or foam polymers including neoprene, ethylene propylene diene monomer (EPDM), polydimethylsiloxane (PDMS), polyethylene, polyurethane including thermoplastic polyurethane (TPU), polyethylene terephthalate (PET), epoxies and epoxy based materials, nitrile rubber, silicone, fiberglass, natural rubber, as well as other natural materials such as sponges, cork and/or wood, etc., woven and/or nonwoven fabrics, and any hybrid combinations such as laminations or composites thereof. The substrate 102 may be implemented as a single component, or may include multiple components arranged in any configuration around the axis.

Although the inventive principles are not limited to any specific materials for use as the deformable conductors, some examples include, but are not limited to, deformable conductors such as gallium indium alloy gels, some examples of which are disclosed in U.S. Patent Application Publication No. 2018/0247727 published on Aug. 30, 2018 which is incorporated by reference. Other suitable conductive materials may include any compositions in liquid, gel and/or elastic form featuring conductive metals including gold, nickel, silver, platinum, copper, etc.; semiconductors based on silicon, gallium, germanium, antimony, arsenic, boron, carbon, selenium, sulfur, tellurium, etc., semiconducting compounds including gallium arsenide, indium antimonide, and oxides of many metals; organic semiconductors; and conductive nonmetallic substances such as graphite. Other examples include gels based on graphite or other allotropes of carbon, ionic compounds or other gels.

In some embodiments, a deformable conductor referred to as being on a substrate may also refer to a conductor that may be partially or completely disposed within a substrate.

The materials used for the substrate and one or more conductors, as well as the arrangement and sizes of the components may be selected to provide any desired electrical and/or mechanical characteristics. For example, in some embodiments, the deformable substrate may be implemented with one or more materials that may have a dielectric property suitable for use in a transmission line. The thickness of the substrate may then be selected to provide a specific characteristic impedance $Z_0$, which may in turn be related to the capacitance and inductance of the geometry and material properties of the conductor(s) and dielectric(s). Likewise, the material or materials used for the deformable conductors may be selected to provide a specific DC resistance.

Figure 2:
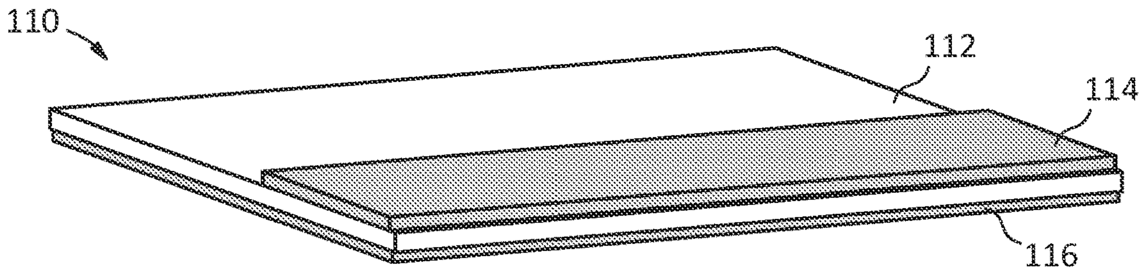
FIG. 2 is a perspective view of an embodiment of a conductive assembly according to this disclosure prior to shaping.
Figure 3:
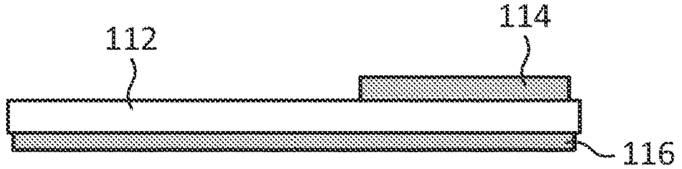
FIG. 3 is a side view of an embodiment of a conductive assembly according to this disclosure prior to shaping.
Figure 4:
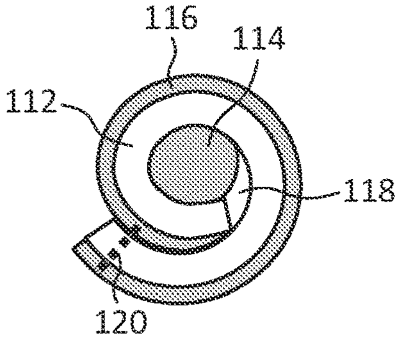
FIG. 4 is a side view of an embodiment of a conductive assembly according to this disclosure after shaping.
Figure 5:
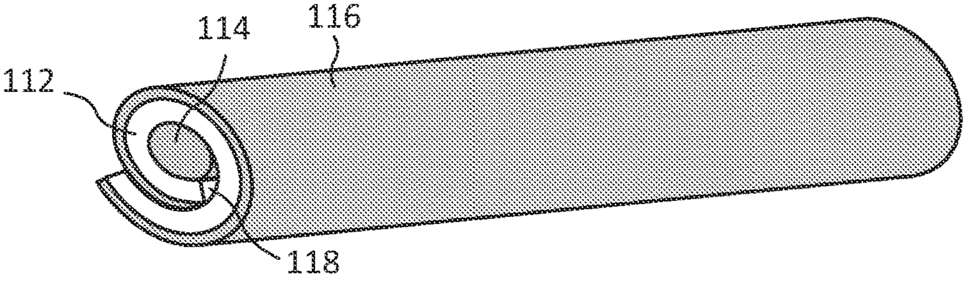
FIG. 5 is a perspective view of an embodiment of a conductive assembly according to this disclosure after shaping.

FIGS. 2-5 illustrate an example embodiment of a coaxial transmission line assembly according to this disclosure. The embodiment 110 illustrated in FIGS. 2-5 may include a deformable substrate 112 formed, for example, from a sheet of stretchable polymer. FIG. 2 is a perspective view of the embodiment 110 prior to shaping. FIG. 3 is a side view of the embodiment 110 in which the axis around which the substrate 112 will be disposed is perpendicular to the plane of the drawing. FIG. 4 is a side view if the assembly after the substrate has been rolled into its final configuration. FIG. 5 is a perspective view of the final assembly after the substrate has been rolled into its final configuration.

Referring to FIGS. 2 and 3, a trace 114 of deformable conductor may be deposited on a first side of the substrate 112, while the other side of the substrate 112 may be essentially covered with a layer 116 of deformable conductor. The conductors 114 and 116 may be implemented, for example, with a conductive gel. In some embodiments, a pattern of dots, grids, etc. may be used to hold the gel in place.

Referring to FIGS. 4 and 5, the substrate 112 may be rolled to form a coaxial transmission line with the first conductor 114 forming a central or signal conductor through the center of the assembly, and the second conductor 116 forming a ground or reference conductor around the signal conductor. The substrate 112 may function as a dielectric between the two conductors.

Though not illustrated in FIGS. 2-5, one or more layers of encapsulant may be included to partially or fully cover either or both of the conductors 114 and 116. An encapsulant may perform one or more functions such as protecting a conductor from exposure to air (which may cause oxidation of the conductor), dirt, moisture, and/or other contaminants, and protecting a conductor from mechanical wear or impact. An encapsulant may also function as an adhesive to hold the assembly together after rolling. An encapsulant may further be used to fill interstitial spaces, such as space 118, which may be formed in the assembly during the rolling process. Examples of materials suitable for encapsulant 118 include silicone based materials such as PDMS, urethanes, epoxies, polyesters, polyamides, varnishes, and any other material that may provide a protective coating and/or help hold the assembly together.

In some embodiments, one or more electric and/or mechanical connections 120 may be formed between overlapping layers of the substrate 112 and/or conductor 116 and may perform any number of functions. For example, connections 120 may mechanically tie overlapping layers of the substrate 112 together to hold the assembly together, as an alternative to, or in addition to, an adhesive encapsulant. As another example, the connections may electrically connect the overlapping layers of conductor 116 to provide a more complete electrical continuity around the circumference of the transmission line. The one or more electric and/or mechanical connections 120 may be formed in any pattern around and/or along the axis of the assembly.

Examples of structures that may be used for the one or more electric and/or mechanical connections 120 include rivets, screws, pins, stiches (conductive and/or nonconductive), etc. In some embodiments, electric connections may be formed by forming one or more vias in the substrate 112 and filling the vias with a conductive material such as a conductive gel, for example, using any of the techniques disclosed in U.S. Patent Application Publication No. 2020/0066628 published on Feb. 27, 2020 which is incorporated by reference.

Electrical and/or mechanical connections may be made to the transmission line in any suitable manner. For example, bonding with adhesives, thermal and/or ultrasonic welding, etc. One or more techniques from U.S. Patent Application Publication No. 2020/0066628 may also be used, for example, to provide electrical connections to one or more of the deformable conductors.

In some embodiments, one or more openings may be formed in the outer deformable conductor 116 and arranged, for example, to change the impedance of the transmission line in response to an object proximate the opening. Thus, the assembly 110 may be used for example, to sense the presence of a user's hand on the transmission line.

Figure 6:
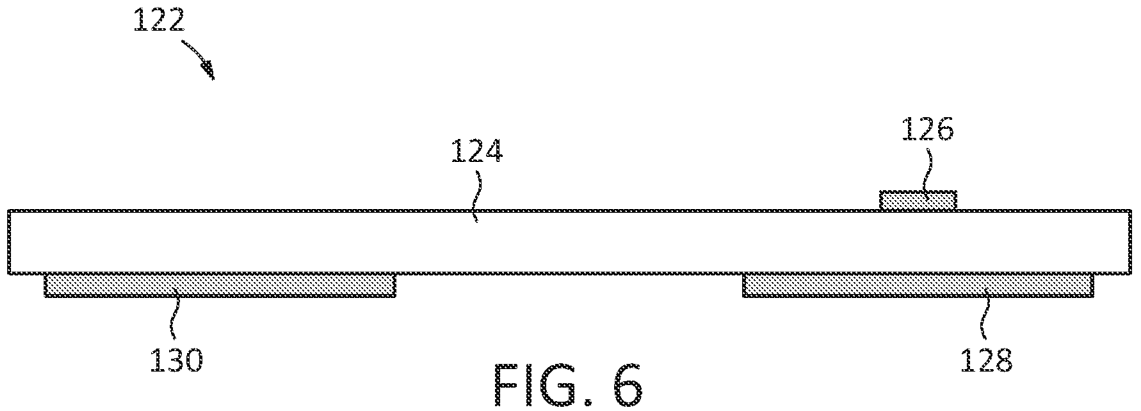
FIG. 6 is a side view of another embodiment of a conductive assembly according to this disclosure prior to shaping.
Figure 7:
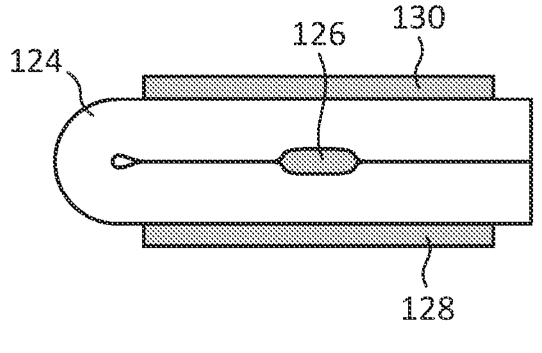
FIG. 7 is a side view of another embodiment of a conductive assembly according to this disclosure after shaping.

FIGS. 6 and 7 illustrate an example embodiment of a deformable microstrip transmission line according to this disclosure. The embodiment 122 of FIGS. 6 and 7 may include a deformable substrate 124 formed, for example, from a sheet of stretchable polymer. FIG. 6 is a side view of the embodiment 122 in which the axis around which the substrate 124 will be disposed is perpendicular to the plane of the drawing. FIG. 7 is a side view of the assembly after the substrate has been folded into its final configuration.

Referring to FIG. 6, a trace 126 of deformable conductor may be formed on a first side of the substrate 124, while two traces 128 and 130 of deformable conductor may be formed on the other side of the substrate 124. The conductors 126, 128 and 130 may be implemented, for example, with a conductive gel. In some embodiments, a pattern of dots, grids, etc. may be used to hold the gel in place.

Referring to FIG. 7, the substrate 124 may be folded to form a stripline transmission line with the first conductor 126 forming a central or signal conductor through the center of the assembly, and the second and third conductors 128 and 130 forming ground or reference conductors on either side of the signal conductor. The substrate 124 may function as a dielectric between the conductors.

Any of the materials and/or techniques described above may be used to implement the embodiment 122 illustrated in FIGS. 6 and 7.

Figure 8:
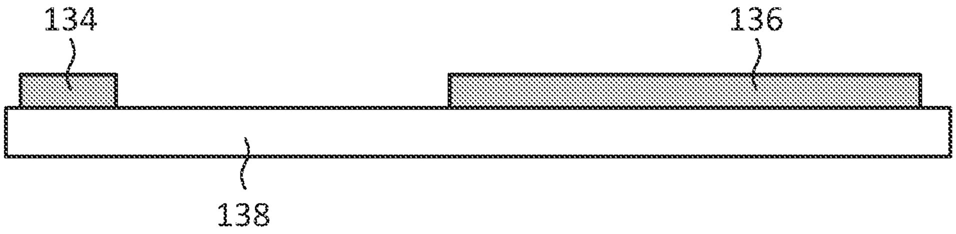
FIG. 8 is a side view of another embodiment of a conductive assembly according to this disclosure prior to shaping.
Figure 9:
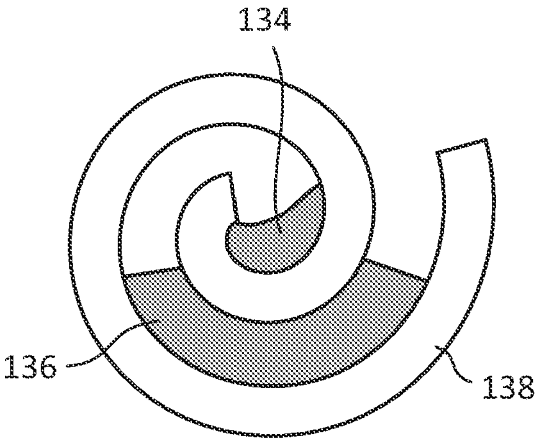
FIG. 9 is a side view of another embodiment of a conductive assembly according to this disclosure after shaping.

FIGS. 8 and 9 illustrate another example embodiment of a deformable transmission line according to this disclosure. In the embodiment illustrated in FIGS. 8 and 9, a deformable signal conductor 134 and a deformable reference conductor 136 may be formed on the same side of a deformable substrate 138. The substrate 138 may then be rolled to form a transmission line having a cross section similar to a microstrip with a curved reference (ground) conductor.

Figure 10:
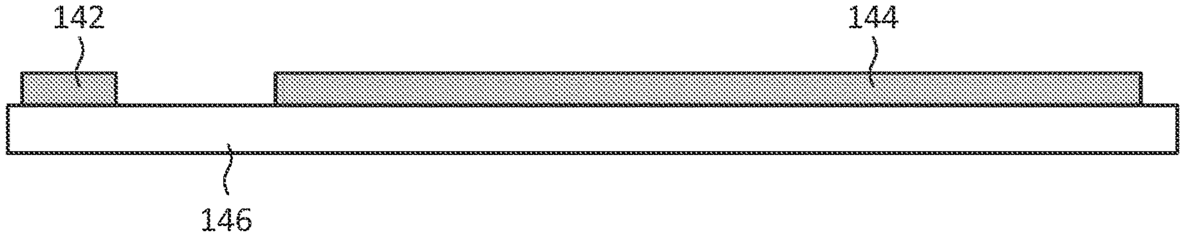
FIG. 10 is a side view of another embodiment of a conductive assembly according to this disclosure prior to shaping.
Figure 11:
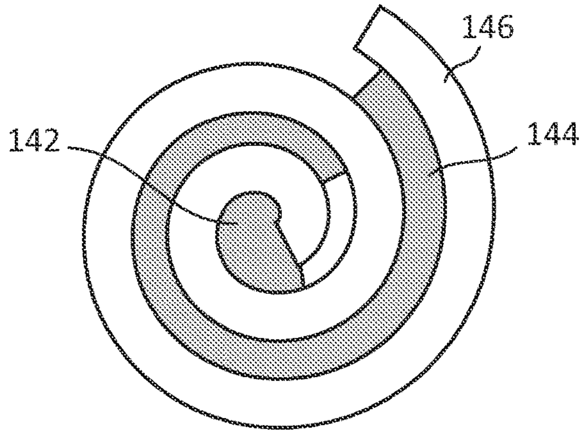
FIG. 11 is a side view of another embodiment of a conductive assembly according to this disclosure after shaping.

FIGS. 10 and 11 illustrate another example embodiment of a deformable transmission line according to this disclosure. In the embodiment illustrated in FIGS. 10 and 11, a deformable signal conductor 142 and a deformable reference conductor 144 may be formed on the same side of a deformable substrate 146. The substrate 146 may then be rolled to form a coaxial transmission line.

Any of the materials and/or techniques described above may be used to implement the embodiments illustrated in FIGS. 8-11.

Figure 12:
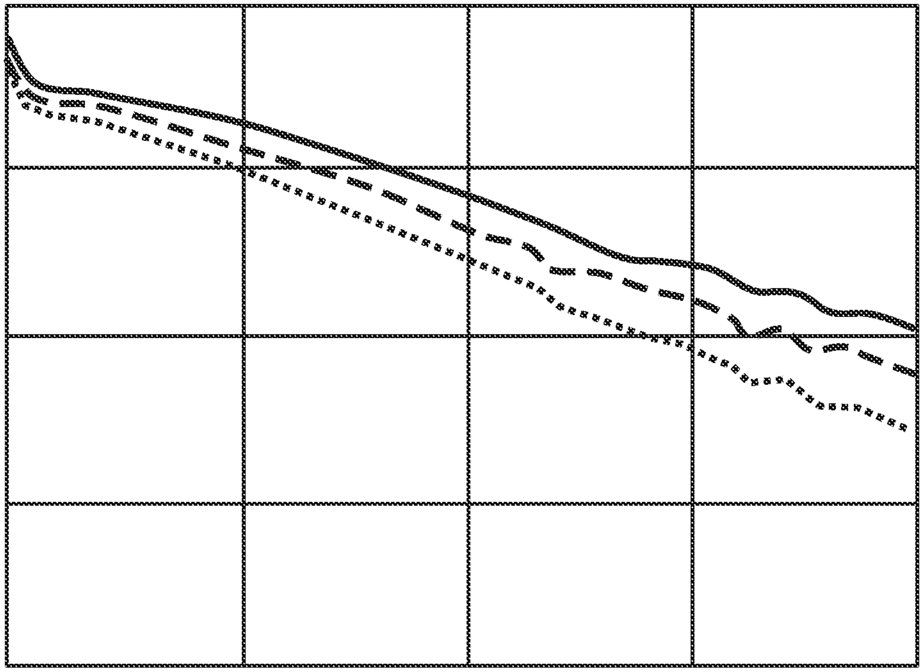
FIGS. 12 and 13 are graphs illustrating insertion loss and return loss, respectively, for an example embodiment of a coaxial transmission line fabricated in accordance with this disclosure.
Figure 13:
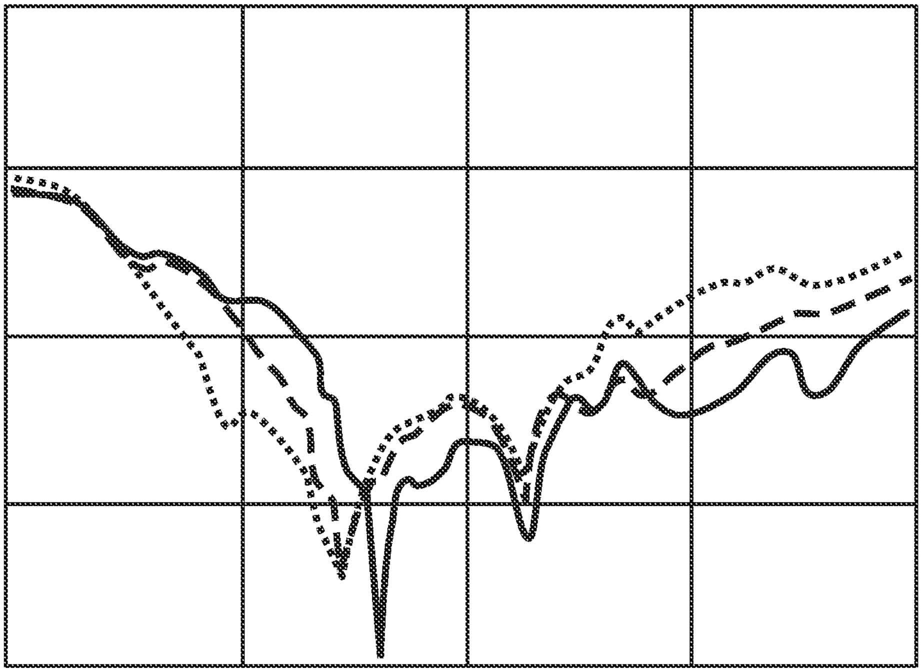

FIGS. 12 and 13 are graphs illustrating insertion loss and return loss, respectively, for an example embodiment of a coaxial transmission line fabricated in accordance with this disclosure. The graphs illustrated in FIGS. 12 and 13 are for purposes of illustrating general trends that may be observed according to the principles of this disclosure, but may not represent actual data from a physical embodiment.

FIG. 12 illustrates examples of insertion loss on a logarithmic (dB) vertical scale versus frequency on a linear horizontal scale for a section of coaxial transmission line subjected to no stretch (solid line), about 10 percent stretch (dashed line) and about 30 percent stretch (dotted line).

FIG. 13 illustrates examples of return loss on a logarithmic (dB) vertical scale versus frequency on a linear horizontal scale for a section of coaxial transmission line subjected to no stretch (solid line), about 10 percent stretch (dashed line) and about 30 percent stretch (dotted line).

As is apparent from the graphs of FIGS. 12 and 13, a deformable conductive structure according to this disclosure may be used in multiple modes, for example, for transmitting signals and/or power, and/or for sensing a deformation of the conductive structure. For example, a sensing circuit may be coupled to a deformable transmission line and configured to sense a stretching of the transmission line based on measuring the insertion loss, return loss, characteristic impedance, etc.

The terms "first", "second", etc., as used herein may be used for convenience of reference, for example, to distinguish between different elements, but the use of "first", "second", etc., for an element does not necessarily imply the presence of another element.

Since the inventive principles of this patent disclosure can be modified in arrangement and detail without departing from the inventive concepts, such changes and modifications are considered to fall within the scope of the following claims.

The invention claimed is:

1. A conductive assembly comprising:

a deformable substrate having major surface; and a deformable conductor arranged on the major surface of the deformable substrate, the deformable conductor comprising a conductive liquid or gel;

wherein the deformable substrate is folded along an axis to bring a first portion of the major surface in contact with a second portion of the major surface and encapsulate the deformable conductor therebetween;

wherein the deformable conductor is a first deformable conductor, and further comprising a second deformable conductor spaced apart from the first deformable conductor, the deformable substrate forming a dielectric between the first and second deformable conductors; and wherein the major surface is a first major surface and wherein the deformable substrate has a second major surface opposite the first major surface, and wherein the second deformable conductor is positioned on the second major surface.

2. The conductive assembly of claim 1, wherein the second major surface forms an exterior surface of the conductive assembly.

3. The conductive assembly of claim 2, further comprising a third deformable conductor, positioned on the second major surface and spaced apart from the second deformable conductor.

4. The conductive assembly of claim 3, wherein the second major surface forms a top portion and a bottom portion, wherein the second deformable conductor is positioned on the top portion and the third deformable conductor is positioned on the bottom portion.

5. The conductive assembly of claim 3, wherein the third deformable conductor is arranged as a reference conductor to form a stripline with the first deformable conductor and the second deformable conductor.

6. The conductive assembly of claim 5, wherein the second and third conductors are arranged substantially along the axis.

7. The conductive assembly of claim 6, wherein the deformable substrate, the first deformable conductor, the second deformable conductor and the third deformable conductor are arranged to form a twin-axial transmission line.

8. The conductive assembly of claim 2, wherein the second deformable conductor is arranged to form a microstrip with the first deformable conductor.

9. The conductive assembly of claim 1, wherein the first deformable conductor comprises a first material, the second deformable comprises a second material, and wherein the first material and second material.

10. The conductive assembly of claim 1, wherein the first deformable conductor comprises a first material, the second deformable comprises a second material, and wherein each of the first material and the second material is a liquid or gel comprising a conductive metal.

11. A conductive assembly comprising:

a deformable substrate having major surface; and a deformable conductor arranged on the major surface deformable substrate, the deformable conductor comprising a conductive liquid or gel;

wherein the deformable substrate forms a spiral cross-section with the deformable conductor to enclose the deformable conductor with the deformable substrate;

wherein the deformable conductor is a first deformable conductor and further comprising a second deformable conductor positioned on the substrate and spaced apart from the first deformable conductor; and wherein the deformable substrate, the first deformable conductor, and the second deformable conductor are arranged to form a coaxial transmission line.

12. The conductive assembly of claim 11, wherein the second deformable conductor is arranged on the major surface of the deformable conductor.

13. The conductive assembly of claim 12, wherein the major surface is a first major surface and wherein the deformable conductor includes a second major surface opposite the first major surface, wherein the deformable substrate forms a gap between the first major surface and the second major surface, and wherein the first and second deformable conductors each extend between the first and second major surfaces.

14. The conductive assembly of claim 13, wherein the second deformable conductor encircles the first deformable conductor, at least in part.

15. The conductive assembly of claim 11, wherein the first deformable conductor comprises a first material, the second deformable comprises a second material, and wherein the first material is the same as the second material.

16. The conductive assembly of claim 11, wherein the first deformable conductor comprises a first material, the second deformable comprises a second material, and wherein each of the first material and the second material is a liquid or gel comprising a conductive metal.

17. A method of fabricating a deformable conductive assembly, the method comprising:

arranging a first deformable conductor on a first major surface of a deformable substrate, wherein the deformable conductor comprises a conductive liquid or gel; and manipulating the deformable substrate along an axis to enclose the deformable conductor, arranging a second deformable conductor spaced apart from the first deformable conductor such that the deformable substrate forms a dielectric between the first and second deformable conductors; and wherein the deformable substrate has a second major surface opposite the first major surface, and wherein the second deformable conductor is positioned on the second major surface.

18. The method of claim 17, wherein manipulating the deformable substrate comprises folding the deformable substrate along the axis to bring a first portion of the first major surface in contact with a second portion of the first major surface and encapsulate the deformable conductor therebetween.

19. The method of claim 17, wherein manipulating the deformable substrate comprises rolling the deformable substrate along the axis to form a spiral cross-section with the deformable conductor to enclose the first deformable conductor.

* * * * *